United States Patent
Zibert (12)

(10) Patent No.: US 6,200,505 B1
(45) Date of Patent: Mar. 13, 2001

(54) METHOD TO IMPROVE POUR-IN PLACE MOLDING TECHNOLOGY

(75) Inventor: Ronald Zibert, Burgettstown, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/628,823

(22) Filed: Jul. 31, 2000

(51) Int. Cl.[7] ............................. B29C 44/06; B29C 44/12
(52) U.S. Cl. ...................... 264/46.5; 264/46.6; 264/46.7; 264/276; 264/510
(58) Field of Search ................................. 264/276, 46.5, 264/46.6, 46.7, 510

(56) References Cited

U.S. PATENT DOCUMENTS

| | | | |
|---|---|---|---|
| 3,821,130 | 6/1974 | Barron et al. | 260/2.5 |
| 3,862,879 | 1/1975 | Barron et al. | 161/159 |
| 4,483,894 | 11/1984 | Porter et al. | 428/95 |
| 4,738,809 | * 4/1988 | Storch | 264/46.6 |
| 4,860,415 | * 8/1989 | Witzke | 29/91.1 |
| 4,906,672 | 3/1990 | Stone et al. | 521/130 |
| 4,925,508 | * 5/1990 | Goto et al. | 156/79 |
| 4,959,184 | * 9/1990 | Akai et al. | 264/40.3 |
| 4,965,029 | 10/1990 | Lidy et al. | 264/45.1 |
| 4,976,414 | * 12/1990 | Yanagishita | 264/40.3 |
| 5,071,605 | * 12/1991 | Kawaguchi et al. | 264/45.2 |
| 5,114,639 | * 5/1992 | Kurz et al. | 264/46.6 |
| 5,124,368 | * 6/1992 | Gill et al. | 521/111 |
| 5,294,386 | * 3/1994 | Roth et al. | 264/46.6 |
| 5,344,596 | * 9/1994 | Hendry | 264/40.3 |
| 5,360,831 | * 11/1994 | Lidy et al. | 521/99 |
| 5,451,104 | * 9/1995 | Kleen et al. | 366/3 |
| 5,478,136 | * 12/1995 | Takeuchi et al. | 297/391 |
| 5,611,977 | * 3/1997 | Takei | 264/46.5 |
| 5,716,560 | * 2/1998 | Heuchert et al. | 264/37 |
| 5,851,457 | * 12/1998 | Peterson et al. | 264/46.5 |
| 6,032,882 | 3/2000 | Farahmand et al. | 241/24.13 |

FOREIGN PATENT DOCUMENTS

| | | |
|---|---|---|
| 1281866 | 3/1991 | (CA) . |
| 36 16 873 | 12/1989 | (DE) . |
| 181604 | 5/1986 | (EP) . |
| 2470566 | 6/1981 | (FR) . |
| 2116574 | 9/1983 | (GB) . |

OTHER PUBLICATIONS

33rd Annual Polyurethane Technical/Marketing Conference, Sep. 30–Oct. 3, 1990, D. Murray et al, pp. 172–176, "Automotive Seat production Using the Pour–In Place Technology".

33rd Annual Polyurethane Technical/Marketing Conference, Sep. 30–Oct. 3, 1990, pp. 32–39, F. W. Schneider et al. "High Volume Pour–In–Place Seating Production Equipment".

* cited by examiner

*Primary Examiner*—Allan R. Kuhns
(74) *Attorney, Agent, or Firm*—Joseph C. Gil; N. Denise Brown

(57) ABSTRACT

This invention relates to an improved method for the production of a pour-in-place composite article. These composite articles comprise an exterior covering and a flexible polyurethane foam core. This method comprises inserting a support armature into a pre-sewn exterior covering, positioning an exterior covering in a shaped mold, and applying pressurized gas to the outside surface of the exterior covering at the point directly opposite the position that the reaction mixture will be injected into the mold. The pressurized gas is either applied to the outside surface of the exterior covering either at some point prior to injection of the reaction mixture into the shaped mold, or the pressurized gas is applied simultaneously with the injection of the reaction mixture into the shaped mold. The application of pressurized gas is discontinued once the injection step is completed, allowing the reaction mixture to fully react and expand to conform the composite article to the shape of the mold. The resultant composite article is then removed from the mold.

5 Claims, 1 Drawing Sheet

METHOD TO IMPROVE POUR-IN PLACE MOLDING TECHNOLOGY

BACKGROUND OF THE INVENTION

This invention relates to an improved method for the manufacture of a pour-in-place (PIP) composite article. These composite articles comprise a porous exterior covering and a flexible polyurethane foam core. The improvement in the pour-in-place method according to the present invention comprises applying pressurized gas to the outside surface of the exterior covering at the point directly opposite the position that the reaction mixture will be injected into the mold either at some point prior to the reaction mixture is injected into the mold, or simultaneously at the point the reaction mixture is injected into the mold, and discontinuing the application of pressurized gas after the injection step is completed.

Most furniture and automotive vehicle seats, armrests and headrests have traditionally been produced from molded polyurethane foam cushions or parts. Subsequent to the foam molding process, the part is wrapped in pre-cut and pre-sewn fabric covers. This "pre-cut and sew" method has drawbacks in that it is very labor intensive and the seats produced by this method tend to deteriorate rapidly or pockets form after repeated use. It is also difficult to achieve a consistently perfect shape from seat to seat and to produce concave contours.

To overcome deficiencies of the "pre-cut and sew" method, the so called "pour-in-place" method was developed in the 1970's. The pour-in-place method involves pouring polyurethane foam reactants in a liquid form onto a pre-shaped cover and then allowing the foam to expand and cure to form an in-situ foamed molded part. Conventional pour-in-place (PIP) technology is known and described in, for example, U.S. Pat. Nos. 4,860,415, 4,959,184, 4,976,414, 5,124,368 and 5,360,831. In the 1970's, the pour-in-place method was applied for the production of office furniture and other simple-shaped articles such as tractor seating using impermeable PVC sheet covers. The pour-in-place method using fabric covers was introduced subsequently and is now referred to as the foam-in-fabric or foam-in-cover method.

In pour-in-place foaming technology, the exterior cover material can be a fabric backed by a thin layer of foam and a urethane film barrier (the so called "barrier" technique), or a fabric backed only by a thin layer of foam. Using the barrier technique, production of molded polyurethane foam filled articles by the PIP process is very efficient.

These "barrier" techniques may include textile composites with or without foam interliners laminated with a nonpermeable film backing. These are placed in a mold and shaped to fit the contours of the mold by applying vacuum. See 33$^{rd}$ Annual Polyurethane Technical/Marketing Conference, Sep. 30–Oct. 3, 1990, D. Murphy et al, Pp. 172–176 and F. W. Schneider et al, Pp. 32–39; as well as U.S. Pat. No. 4,738,809 and EP-A-1 901 828 and EP-A-1 181 604. The non-permeable film serves two purposes: (a) when vacuum is applied between the mold surface and the laminate, no air is sucked through the laminate and the laminate is pressed upon the mold surface and (b) the foam formulation which is poured in a liquid state on top of the laminate cannot penetrate or strike-through the non-permeable layer. This eliminates unacceptable stiffening and staining of the fabric. However, since the laminate is non-permeable to any fluid or gas, there is a definite drop in thermal comfort of the seats produced with this technique. This is a clear disadvantage for car seats because lack of "breathability" makes car seats particularly uncomfortable to use for an extended period of time.

When exterior covers are only foam backed (i.e., no urethane film is present), the liquid foaming reaction mixture frequently penetrates the foam layer and forms a hard spot on the fabric surface. Although this fabric type is much less expensive to use due to the absence of the urethane film barrier, this hard spot defect results in rejects during production, a loss in efficiency and costly manual recovery of the armature or support. The cover is not reusable and the cost of cover material and the manual sewing step is also lost.

Methods of increasing reaction speed and foam viscosity, well known in the industry, are ineffective at resolving this production problem. Improvement can be made by lowering machine output but this increases cycle time and lowers production rate. Thus, manufacturers are generally unwilling to do this.

One method of avoiding this problem, is to glue an extra piece of foam backed fabric cover material on to the interior of the presewn cover directly under where the liquid foaming urethane mixture is introduced into the cover under high pressure. This additional step, however, adds to the cost of the cover assembly.

Another solution has been to use a funnel designed to divert the reaction mixture being injected away from the bottom surface of the exterior cover where the penetration occurs. This also adds to the cost of production as these funnels are expensive to produce and more difficult to clean and reuse in production.

As discussed above, the lack of "breathability" is a clear disadvantage for car seats because this results in car seats that are particularly uncomfortable to use for an extended period of time. To overcome the "breathability" problem, a so-called "non-barrier" foam-in-fabric technique has recently been developed. According to the non-barrier technique, the fabric is laminated with a polyurethane slabstock foam layer of about 2 to 5 mm thickness but without the non-permeable fill. The slabstock foam layer can be of two types, having virtually zero or low air breathability. Low breathability slabstock foams usually have less than 1.0 cfm breathability as measured in accordance with ASTM Method D-3574 p. 9 Ref.: Air Flow Test.

When a slabstock foam layer is used which has virtually zero air breathability, it protects the fabric against liquid polyurethane foam reactants to almost the same extent that is achieved by using the non-permeable film. However, the low porosity of the foam layer produces little improvement to thermal comfort of a car seat compared to the one produced by the barrier technique.

On the other hand, when a slabstock foam backing is used which has some air breathability, it is obvious that polyurethane reactants can not be poured in liquid form since they will penetrate the foam layer creating a hard spot and staining the fabric.

In order to avoid penetration of the foam layer, two techniques are currently being used. One requires the use of foam formulations which have a very fast cream time (cream foams) as described in FR-A-2,470,566. Such cream foams, however, create a problem as foam flow is reduced and, for larger molds, filling problems occur. Thus, a cream foam technique is mainly applicable for production of small articles such as car head rests. Additionally, other problems are experienced such as fogging or chemical staining of the fabric by amine vapors due to the very high levels of amine catalysts required to produce the cream foam. The high catalyst level also leads to high foam compression set values, especially after humid ageing.

The other technique uses a pre-expansion chamber. In this technique, the liquid foam reactants, after mixing, are kept for a short time in a chamber where the reactions start. The reactive blend can, therefore, reach a creamy stage before being poured onto the fabric. A version of this device is described in U.S. Pat. No. 4,925,508. The disadvantage of this technique is that it is mechanically difficult to build a reusable preexpansion chamber due to the plugging of movable parts by the reactants.

That is the reason why, in U.S. Pat. No. 4,925,508, the pouring nozzle, acting as a pre-expansion chamber, is made out of plastic (polyethylene or polystyrene) and disposed of after each pour. The use of a pre-expansion chamber described in U.S. Pat. No. 4,925,508 will particularly be inconvenient and uneconomical for use of a typical molding line where several different parts would be produced.

It is known to use gases such as gaseous carbon dioxide as a blowing agent for molded polyurethane foam. See, for example, EP-A-0 089 796, EP-A-0 267 490, DE-OS-3,916,873, U.S. Pat. Nos. 3,821,130, 3,862,879, 4,483,894, 4,906,672 and 4,965,029. None of these references or any other known references, however, describe or even suggests the use of a non-reactive gas in a process for making low density pour-in-place or foam-in-fabric articles for cars or furniture.

In U.S. Pat. No. 5,360,831, it was disclosed that the use of an inert gas in a flexible foam formulation, and particularly a high resilience foam formulation, to froth the foam formulation when pouring the same onto a foam backing of the fabric, eliminated penetration of the foam layer even with foam layer with air flows higher than 1.0 cfm, and did not reduce the flow of the foaming mass. This was unexpected and different from the cream-foam or the pre-expansion chamber techniques described above.

The process of U.S. Pat. No. 5,360,831 relates to the preparation of pour-in-place articles, specifically car or furniture seats, arm-rests and head-rests. It comprises pouring a flexible or a semi-flexible polyurethane (cold or hot cured, particularly high resilience) foam formulation onto a pre-shaped composite cover and allowing the foam formulation to rise and cure. This process requires a sufficient amount of an inert gas to be dissolved in or dispersed in the foam formulation such that the liquid foam reactants leave the mixing head in a partially frothed state.

Gas assisted injection molding is known and described in, for example, U.S. Pat. Nos. 5,344,596 and 5,716,560. These processes comprise the injection of a flowable thermoplastic material followed by injection of at least one portion of an inert gas into the cavity. The injected gas is dispersed along the inner face of the thermoplastic material and forces it against the inner face of the mold, thereby improving the appearance or surface quality of the appearance side of the resultant molded part.

In the method for forming an armrest disclosed in U.S. Pat. No. 5,611,977, a base foaming urethane material is injected as a liquid into a preformed three-dimensional trim cover assembly within a foaming die, and allowed to foam to form the armrest body for an automotive seat. Impregnation of the foam layer with the liquid foaming material requires that the trim cover assembly comprises a permeable top cover layer, a low-density foam layer, an impregantion preventive film having plural ventiliation holes formed therein, and a high density foam layer in the order listed.

It has now unexpectedly been discovered that the penetration of the exterior cover material by the liquid foaming material into the non-barrier protected foam backing may be substantially reduced and/or eliminated by simply injecting pressurized gas onto the exterior of the fabric surface directly opposite from where the liquid stream impinges the foam backed cover. The pressurized gas stream is applied to the outside of the exterior cover material either from just before the liquid foaming material is injected from the high pressure metering equipment through the injection port, or simultaneously with the start of the injection of the liquid foaming material from the high pressure metering equipment through the injection port. The gas pressure is stopped just after the injection of the liquid foaming urethane mixture is complete. This simple step significantly reduces, if not eliminates, the formation of hard spot defects without the added cost of other solutions.

All of the known prior art processes continue to suffer problems with the foaming reaction mixture penetrating through the exterior covering of non-barrier protected cover composites. It has been found that the application of pressurized gas to the outer surface of the exterior covering directly across from the injection port through which the reaction mixture enters the inside cavity formed by the exterior covering material assists in preventing the reaction material from impregnating the exterior covering material.

SUMMARY OF THE INVENTION

This invention relates to a method of reducing or eliminating the formation of hard spot defects and discoloration in the exterior covering material which occur due to penetration of the liquid foaming materials in the process of manufacturing a molded polyurethane foam filled article via the pour-in-place process.

More specifically, this invention is directed to an improved process for the production of a composite article having an exterior covering and a foam core, preferably a polyurethane foam core, more preferably a flexible polyurethane foam core, by the pour-in-place technique. This process comprises the steps of:

1) inserting a support armature into a pre-sewn exterior covering;

2) positioning the exterior covering containing the support armature in a shaped mold, preferably wherein the exterior covering is an upholstery material;

3) closing the mold;

4) applying pressurized gas to the outside surface of the exterior covering directly opposite the position where the fluid reacting intermediates will be injected into the mold;

5) injecting the fluid reacting intermediates into the shaped mold inside the exterior covering;

6) discontinuing the application of pressurized gas once the injection step is complete;

7) allowing the fluid reacting intermediates to fully react and expand to form a foam core inside the exterior covering material, thereby forming a composite article; and 8) removing the composite article from the mold.

Composite articles prepared by the process of the present invention correspond to the shape of the mold.

It is preferred that steps 1) through 8) are sequential in the process of the invention.

In an alternate embodiment of the present invention, this process comprises the steps of:

1) inserting a support armature into a pre-sewn exterior covering;

2) positioning the exterior covering with the support armature in a shaped mold, preferably wherein the exterior covering is an upholstery material;

3) closing the mold;

4) simultaneously:
   (i) applying pressurized gas to the outside surface of the exterior covering directly opposite the position where the fluid reacting intermediates are injected into the mold; and
   (ii) injecting the fluid reacting intermediates into the shaped mold inside the exterior covering;

5) discontinuing the application of pressurized gas to the outside surface of the exterior covering once the injection step is complete;

6) allowing the fluid reacting intermediates to fully react and expand to form a foam core inside the exterior covering, thereby forming a composite article; and 7) removing the composite article from the mold.

In accordance with the various embodiments of the present invention, it is preferred that the foam core comprises a polyurethane foam core, most preferably a flexible polyurethane foam core.

Preferred fluid reacting intermediates for forming a polyurethane foam core comprise a) a polyisocyanate component, b) an isocyanate-reactive component, c) at least one catalyst, and d) a blowing agent, preferably comprising water.

DETAILED DESCRIPTION OF THE INVENTION

Figure 1:
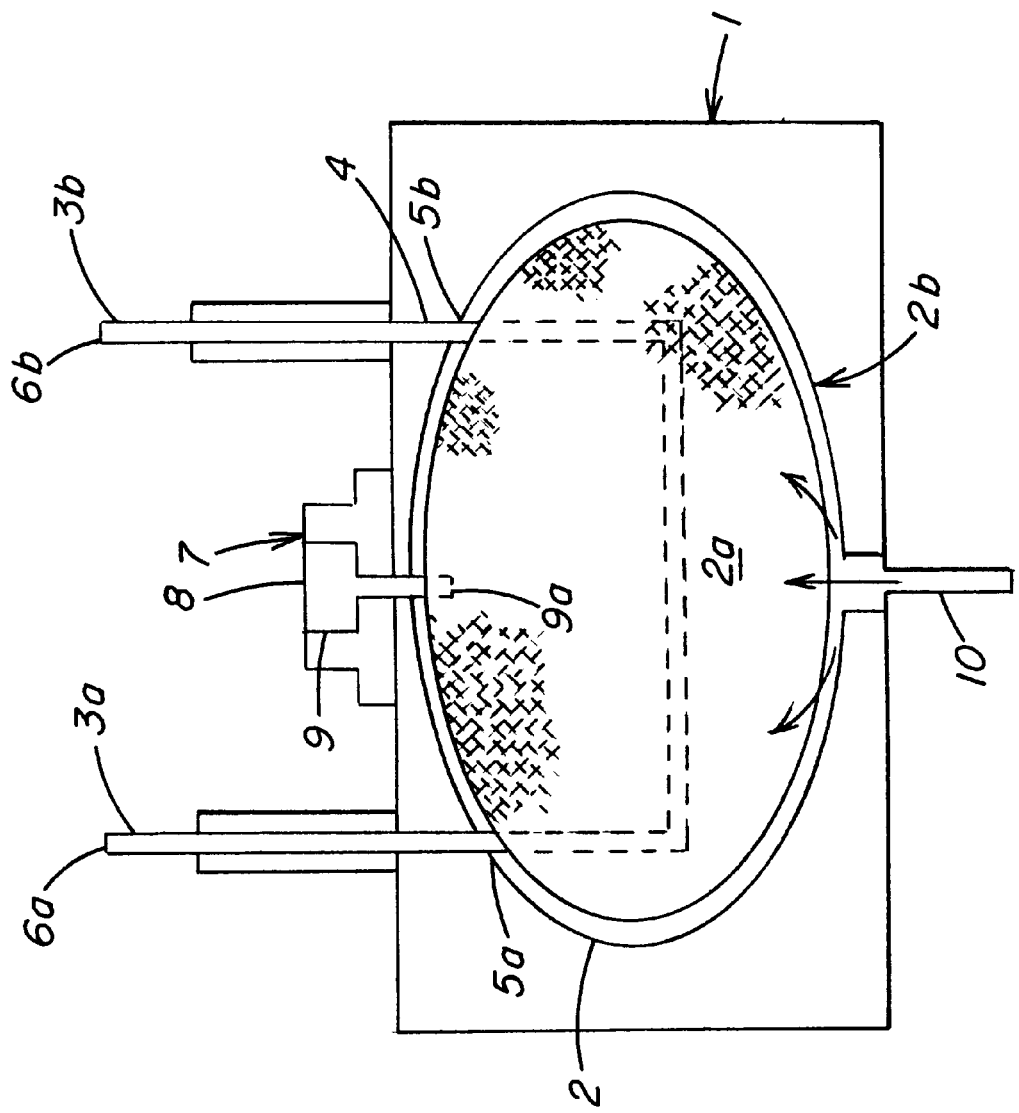
FIG. 1 is a cross-sectional view of one pour-in-place molding apparatus in which pressurized gas is applied to the exterior of the porous exterior fabric covering through an air inlet port which is located directly opposite the injection port through which a liquid reaction mixture is injected.

In accordance with the present invention, suitable materials to be used as the porous exterior covering material include those which have a thin layer of polyurethane foam on the inside face. The exterior covering materials of the present invention include, for example, fabrics and other upholstery materials such as those commonly used in the automotive and furniture industry which are normally woven fabrics of one sort or another. Preferred exterior covering materials include those used by the automotive industry.

Suitable reactants to be injected into the shaped mold inside the exterior covering material in accordance with the present invention, include, for example, those that preferably form polyurethane foams, and most preferably form flexible polyurethane foams upon reaction. As is known by one of ordinary skill in the art, flexible polyurethane foams may be prepared by the reaction of a) a suitable di- or poly-isocyanate component, b) an isocyanate-reactive component, c) one or more catalysts, and d) a suitable blowing agent which may include water, carbon dioxide, an inert gas, or some other suitable blowing agent. Water is a preferred blowing agent.

Suitable di- and/or poly-isocyanates to be used as component a) in the present invention include aromatic, aliphatic, alicyclic, and/or araliphatic isocyanate compounds as are known in the art. Some examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocyanatocyclohexyl) methane, 2,4'-dicyclohexylmethane diisocyanate, 1,3- and 1,4-bis(isocyanatomethyl) cyclohexane, bis(4-isocyanato-3-methyl-cyclohexyl) methane, α,α,α',α'-tetramethyl-1,3- and/or -1,4-xylylene diisocyanate, 1-isocyanato-1-methyl-4(3)-isocyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane triisocyanate and polymethylene poly(phenyl-isocyanates) obtained by phosgenating aniline/formaldehyde condensates may also be used.

In accordance with the present invention, at least a portion of the polyisocyanate component may be present in the form of an NCO prepolymer or a polyisocyanate adduct, preferably, a polyisocyanate adduct. Suitable polyisocyanate adducts are those containing isocyanurate, uretdione, biuret, urethane, allophanate, carbodiimide and/or oxadiazinetrione groups. The polyisocyanate adducts have an average functionality of about 2.0 to about 4 and an NCO content of ca. 5 to ca. 48% by weight.

Suitable isocyanate-reactive compounds to be used as component b) in the present invention include, for example, polyether polyols, polyester polyols, amine-terminated polyether polyols, polythioethers, polyacetals, polycarbonates, polymer polyols or filled polyols, etc., which typically contain from 2 to 6 isocyanate-reactive groups of the type known for the production of polyurethanes. Compounds such as these generally are characterized by a number average molecular weight of from about 1,000 to about 6,000, preferably from about 2,500 to about 6,000, and more preferably from about 4,000 to about 6,000; and have an OH number of from about 20 to about 150, preferably, from about 25 to about 125, and more preferably from about 28 to about 75.

The high molecular weight polyethers suitable for use in accordance with the invention are known and may be obtained, for example, by polymerizing tetrahydrofuran or epoxides, such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms, such as, water, alcohols or amines. Examples of suitable alcohols and amines include the low molecular weight chain extenders and crosslinking agents set forth hereinafter, such as, for example, propylene glycol, glycerin, ethylene glycol, triethanolamine, water, trimethylolpropane, bisphenol A, sucrose, aniline, ammonia, ethanolamine and ethylene diamine.

Polyether polyols are preferably used as component b) in the invention. Preferred polyethers include, for example, those compounds based on di- or tri-functional starters, such as, for example, water, ethylene glycol, propylene glycol, glycerin, trimethylolpropane, or triethanolamine. The preferred compounds are polymers prepared from propylene oxide and include polyoxypropylene polyols.

Suitable examples of high molecular weight polyesters include, for example, the reaction products of polyhydric, preferably dihydric alcohols (optionally, in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described, for example, in U.S. Pat. No. 4,098,731 and 3,726,952, herein incorporated by reference in their entirety. Suitable polythioethers, polyacetals, polycarbonates and other polyhydroxyl compounds are also disclosed in the above-identified U.S. Patents. Finally, representatives of the many and varied compounds, which may be used in accordance with the invention, may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

In another embodiment, the isocyanate-reactive component b) may additionally comprise: a dispersion of a polyurea and/or polyhydrazodicarbonamide in a relatively high molecular weight organic compound containing at least two hydroxyl groups, a polymer polyol prepared by polymerizing an ethylenically unsaturated monomer or monomers in a relatively high molecular weight organic compound containing at least two hydroxyl groups, or blends thereof. It is possible to use these types of polyols either alone, or in conjunction with the conventional polyethers described hereinabove.

These types of polyols are known, and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and aminofunctional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschriften 2,324,134, 2,423,984, 2,512,385, 2,513,815, 2,550,796, 2,550,797, 2,550,833, 2,550,862, 2,633,293, and 2,639,254, the disclosures of which are herein incorporated by reference. See also U.S. Pat. Nos. 3,325,421, 4,042,537, 4,089,835, 4,293,470, 4,296,213, 4,374,209, and 4,786,706, the disclosures of which are herein incorporated by reference. Polyols of this type are commercially available from Bayer Corporation and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene or acrylonitrile in the presence of polyether polyol are also suitable, as are polybutadienes containing OH groups. Such polymer polyols are described in U.S. Pat. Nos. 3,383,351, 3,304,273, 3,523,093, 3,110,685, and U.S. Pat. Nos. RE 28,715 and 29,118, and German Patent 1,152,536, the disclosures of which are herein incorporated by reference. Polymer polyols are commercially available from Bayer AG, BASF, and Arco.

The preferred PHD polyols include, for example, the polyurea of toluene diisocyanate and hydrazine dispersed in polyether polyol, and the preferred polymer polyols include, for example, those based on the monomers styrene and acrylonitrile.

In addition, other suitable isocyanate-reactive components to be used as part/all of component b) of the present invention include the relatively lower molecular weight compounds such as chain extenders and crosslinking agents. Compounds such as these typically have functionalities of from 2 to 4 and molecular weights of about 60 to less than 1,000. Suitable compounds include, for example, glycols, such as, for example, ethylene glycol, propylene glycol, 1,2- and 1,3-propane diol, 1,3 and 1,4- and 2,3-butanediol, 1,6-hexanediol, dipropylene glycol (DPG), tripropylene glycol (TPG), diethylene glycol (DEG), triethylene glycol (TEG), tetraethylene glycol, tetrapropylene glycol, heptapropylene glycol, 2-methyl-1,3-propanediol, 1,10-decanediol, neopentyl glycol, and 2,2,4 trimethylpentane-1,3-diol, etc. Suitable monoalcohols include compounds, such as, for example, methanol, ethanol, 1-propanol, 2-propanol, n-butanol, 1-pentanol, 2-ethyl-1-hexanol, stearyl alcohol, and alkyl substituted phenols containing from 1 to 22 carbon atoms in the alkyl group such as, for example, nonylphenol. Preferred chain extenders include DEG, TEG, DPG, TPG and mixtures thereof.

Catalysts known in polyurethane chemistry may be added to accelerate the reaction between isocyanates and the isocyanate-reactive compounds. Examples of suitable catalysts include organometallic catalysts. The preferred catalysts are the tin catalysts.

Some examples of suitable organometallic catalysts include, for example, organometallic compounds of tin, lead, iron, bismuth, mercury, nickel, etc. Preferred organotin catalysts include compounds, such as, for example, tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di-(2-ethylhexyl)tin oxide, etc. Delayed action or heat-activated tin catalysts, such as, for example, dibutyltin dimercaptide, dibutyltin diisooctylmercaptoacetate, dimethyltin dimercaptide, dibutyltin dilaurylmercaptide, dimethyltin dilaurylmercaptide, dimethyltin diisooctylmercaptoacetate, di(n-butyl)tin bis (isooctylmercaptoacetate), and di(isooctyl)tin bis (isooctylmercaptoacetate), all of which are commercially available from Witco Chemical Corp., are especially preferred. The use of a delayed action catalyst, such as, an iron pentanedione or a bismuth carboxylate, as described in U.S. Pat. No. 4,611,044, herein incorporated by reference, is also possible. The use of a delayed action catalyst such as nickel acetylacetonate, as described in, for example, U.S. Pat. Nos. 3,772,224 and 3,849,156, the disclosures of which are herein incorporated by reference, is also possible.

Organometallic catalysts are usually used in amounts ranging from about 0.01% to about 2.0%, preferably about 0.05% to 0.5% per 100 parts of isocyanate-reactive material. It is most preferred that the catalysts be used in quantities such that they comprise less than 1.0% by weight, preferably less than 0.5% by weight of the total composition.

Blowing agents which are suitable for the preparation of the flexible polyurethane foams include, for example, water, pressurized carbon dioxide, and/or readily volative organic substances. Some examples of suitable organic blowing agents include compounds such as acetone, ethyl acetate, halogen substituted alkanes, such as, for example, methylene chloride, chloroform, ethylidene chloride, vinylidene chloride, monofluorotrichloromethane, chlorodifluoromethane as well as butane, pentane, hexane, heptane and diethyl ether. Azo compounds, such as, azoisobutyric acid nitrile are also suitable.

In addition, various additives and auxiliary agents may be included in the liquid reacting intermediates which react to form a polyurethane foam. Some examples of suitable additives and auxiliary agents include silicone surfactants, pigments, emulsifiers, foam stabilizers, reinforcing agents, stabilizers, antioxidants, plasticizers, adhesion promoters, dyes, etc. Useful fillers include materials, such as, for example, calcium carbonate, alumina trihydrate, titanium dioxide, iron oxide, barium sulfate, etc. In general, fillers are usually used in quantities of from about 20 to 300 parts per 100 parts of the polyol mixture. Suitable antioxidants include, for example, Irganox 245, and suitable UV stabilizers include, for example, Tinuvin 765, etc.

As used herein, the term "molecular weight" refers to the number average molecular weight.

In accordance with the present invention, the pressurized gas that is applied to the exterior surface of the exterior cover material is an inert gas. Some examples of suitable gases include nitrogen, air, carbon dioxide, etc. Nitrogen is the preferred inert gas.

The pressurized gas is applied to the outer surface of the exterior covering material by means of a hose attached to an inlet port in the mold which is located directly opposite the injection port into the mold cavity through which the fluid reacting intermediates are injected. The pressurized gas is applied either from a point prior to the injection of the liquid reacting intermediates, or simultaneously with the injection of the liquid reacting intermediates.

In accordance with the present invention, the inert gas is pressurized to a minimum of at least 5 psi, preferably at least 30 psi and a maximum of no more than 50 psi.

Reference will now be made to the figure in order to more clearly explain the invention. In FIG. 1, a cross-sectional view of a molding apparatus which is suitable for a pour-in-place molding process. In FIG. 1, the mold 1 is shown in the closed position. The inside face 2a of the porous exterior covering material 2 is shown in the mold cavity. Support armatures 3a and 3b are two legs of a single U-shaped rod 4. The rod 4 passes through apertures 5a and 5b in the porous exterior cover material 2 by passing the end 6a of one leg 3a into the cover through the aperture 5b and then out of the cover through the aperture 5a. Optionally, one or both of the legs 3a and 3b have one or more detent notches (not shown) which are used to hold the finished article in a position relative to another part. The mold 1 also has a mixhead mounting plate 7 and injection port 8 through which the polyurethane forming reaction mixture is injected directly into a funnel 9. The polyurethane forming reaction mixture enters the inside of the porous exterior covering material through an opening 9a at the bottom of the funnel. Directly opposite the injection port 8 and the opening 9a at the bottom of the funnel 9 is an air inlet port 10 through which pressurized gas in applied to the exterior surface 2b of the porous exterior covering material 2 to prevent the polyurethane forming reaction mixture from bleeding through and/or from forming hard spot defects on the porous exterior covering material 2.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a pour-in-place composite article having an exterior covering and a foam core via the pour-in-place technique, comprising the steps of:

1) inserting a support armature into a pre-sewn exterior covering;

2) positioning the exterior covering with the support armature in a shaped mold;

3) closing the mold;

4) applying pressurized gas to the outside surface of the exterior covering directly opposite the position where fluid reacting intermediates will be injected into the mold;

5) injecting the fluid reacting intermediates into the shaped mold inside the exterior covering;

6) discontinuing the application of pressurized gas to the outside surface of the exterior covering once the injection step is complete;

7) allowing the fluid reacting intermediates to fully react and expand to form a foam core inside the exterior covering, thereby forming a composite article; and 8) removing the composite article from the mold.

2. The process of claim 1, wherein steps 1) through 8) are sequential.

3. The process of claim 1, wherein steps 4) and 5) are simultaneously initiated.

4. The process of claim 1, wherein the fluid reacting intermediates comprise a) at least one polyisocyanate component, b) at least one isocyanate-reactive component, c) at least one catalyst, and d) at least one blowing agent, and react to form a polyurethane foam core.

5. The process of claim 1, wherein the exterior covering is an upholstery material.

* * * * *